Nov. 29, 1955     J. LEVINE     2,724,991
STEREOSCOPIC VIEWERS
Filed May 7, 1953
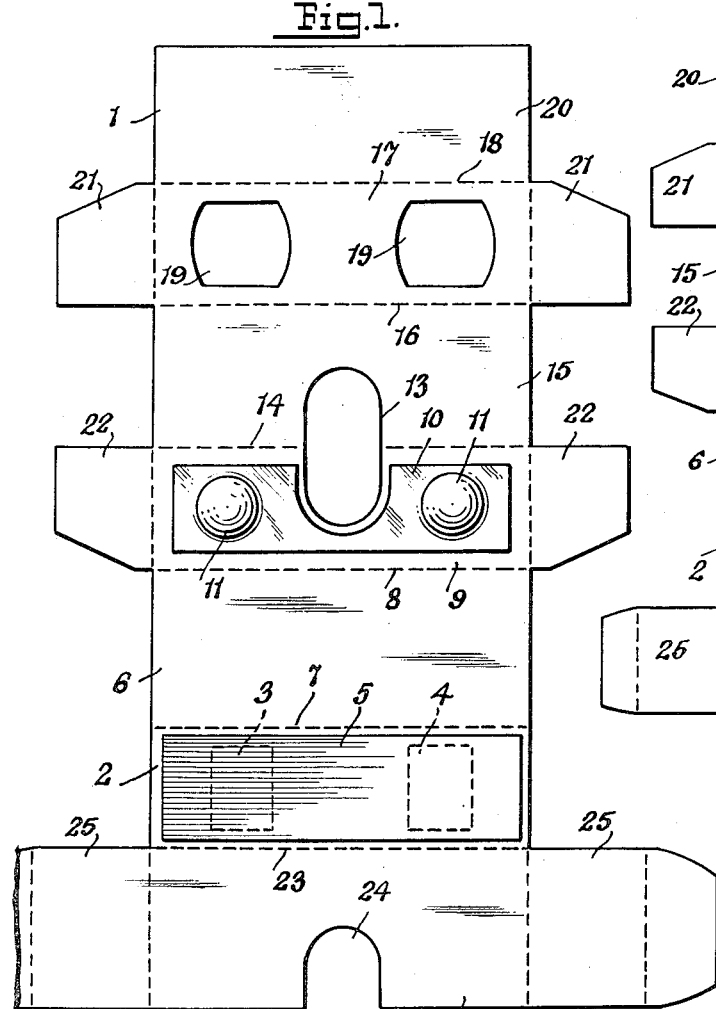
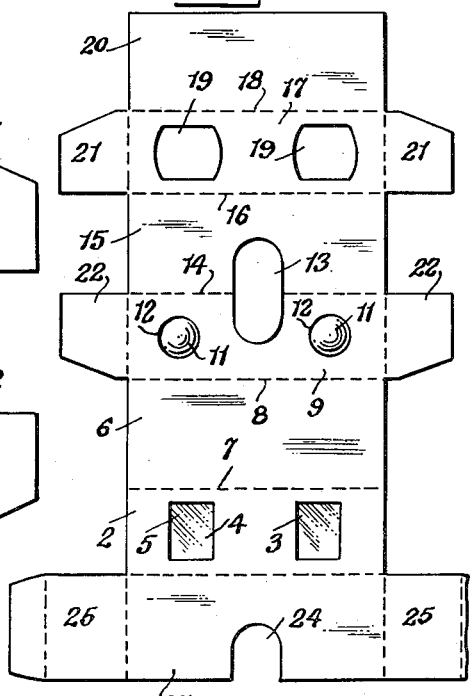
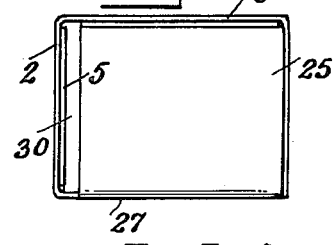
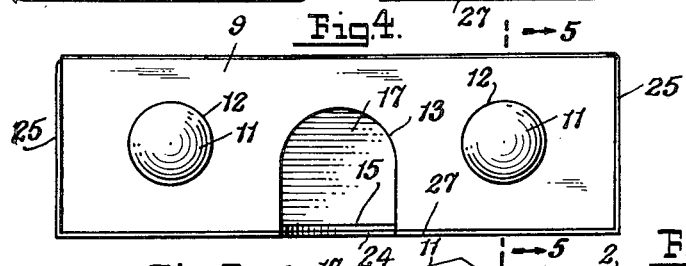
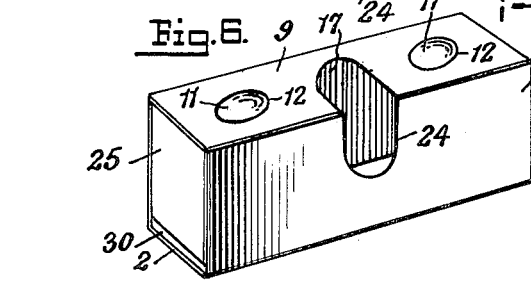
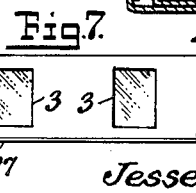
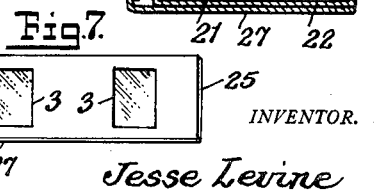
INVENTOR.
Jesse Levine
BY Harry Radzinsky
ATTORNEY

United States Patent Office 2,724,991
Patented Nov. 29, 1955

2,724,991

STEREOSCOPIC VIEWERS

Jesse Levine, Great Neck, N. Y.

Application May 7, 1953, Serial No. 353,560

3 Claims. (Cl. 88—29)

This invention relates to viewers, and particularly to those adapted for use as stereoscopic viewers and by means of which stereoscopic slides can be viewed to secure third dimensional effects.

Stereoscopic viewers are of known construction but the same, in many cases, are of relatively high cost. With this in mind, the present invention has for its primary object the provision of a viewer which can be made very inexpensively; which can be fabricated largely from cardboard or similar inexpensive sheet material, and which because of its relatively inexpensive construction can be sold very cheaply or perhaps distributed as souvenirs or premiums, or as gifts for children.

It is another object of the invention to provide a stereoscopic viewer which can be collapsed or knocked-down to flattened formation, thereby enabling it to be mailed or shipped flatwisely; which can be easily provided with a body or housing formed from a single cardboard sheet, and readily fitted together into a box-like viewer body.

It is still another object of the invention to provide a viewer body composed of cardboard and to provide lenses and diffusing means of inexpensive materials, thus keeping the overall manufacturing cost of the device at a very low level while at the same time providing a thoroughly practical and useful device.

With these and other objects to be hereinafter set forth in view, I have devised the arrangement of parts to be described and more particularly pointed out in the claims appended hereto.

In the accompanying drawing, wherein an illustrative embodiment of the invention is disclosed, Fig. 1 is a face view of the viewer in its flattened or unfolded condition, looking at the inside face of the same;

Fig. 2 is a view of the viewer in its open condition, looking at the outside face of the same;

Fig. 3 is an end view of the viewer;

Fig. 4 is a rear view of the same;

Fig. 5 is a sectional view, taken substantially on the line 5—5 of Fig. 4, looking in the direction of the arrows;

Fig. 6 is a perspective view of the viewer, and

Fig. 7 is a front elevational view of the same on a reduced scale.

Referring to the drawing, 1 indicates the body of the viewer, shown in its open position in Figs. 1 and 2. It preferably, but not necessarily, consists of a single sheet of cardboard which, when folded on the several fold lines, indicated as dotted lines in Fig. 1, assumes the condition of a rectangular cardboard box clearly seen in Fig. 6.

The front wall of the box-like viewer is indicated at 2 and the same is formed with a pair of spaced openings indicated respectively at 3 and 4. A strip of light-diffusing material 5, which can be ground or opal glass, tracing cloth or other suitable translucent material, is secured on the inside face of the wall 2 to thus cover the openings 3 and 4 and diffuse the light entering therethrough. The front wall of the box is defined by the fold lines 7 and 23 and beyond the fold line 7 and located between the same and an adjacent parallel fold line 8, is the top wall 6.

Between the fold line 8 and another parallel fold line indicated at 14, is the rear wall 9 which is formed with a pair of spaced, round openings 12. Each of said openings 12, and which constitute eye-holes, is fitted with a lens 11. The lenses may be separate elements or the same may be provided as a part of a molded plastic strip 10 secured adhesively or otherwise attached to the inside face of the rear wall 9.

An inner bottom wall 15 adjoins the top wall 9 and beyond said inner bottom wall is located an apertured inner front wall 17. The inner front wall 17 is formed with a pair of spaced openings indicated at 19. The inner front wall 17 is defined by the fold lines 16 and 18, and beyond the fold line 18 is located a top wall flap 20.

Formed partly in the top wall 9 and partly in the inner bottom wall 15 is a nose opening 13, the plastic lens strip 10 being cut away as shown to clear said opening. An outer bottom flap 27 extends from the front wall 2, and said bottom flap 27 is formed with a notch 24 which lies in registration with a portion of the nose opening 13 when the viewer body is folded into its box-like shape as shown in Figs. 3 to 7 inclusive.

The inner front wall 17 is provided at its opposite ends with end-closure flaps 21, and similar flaps 22 are provided at the opposite ends of the rear wall 9. Foldable closure flaps 24 are provided at the opposite ends of the outer bottom flap 27.

To erect or set up the flat blank or sheet into the box-like housing, the sheet shown in Figs. 1 and 2 is folded on the several fold lines 23, 7, 8, 14, 16 and 18, to thereby bring the parts into the positions shown in Fig. 5. The end-closure flaps 21 and 22 are thereafter folded inwardly into overlapped position and then the outer closure flaps 25 are folded into place to close the ends of the box. The box is then in the condition shown in Fig. 6.

It will be observed that the widths of the several parts of the box, including the end closure flaps therefor, are such that when the box is folded as above described, there is provided a slot-like space or aperture 30 in the front part of the box between the diffused front wall 2 and the apertured inner front wall 17. This slot-like opening provides space for the reception of a stereoscopic slide, which may be inserted into said space 30 through either end of the box and slidably moved therethrough to register its pictures with the aligned openings 3, 4 and 19 and lenses 11.

In using the viewer, the same is held in the hand with the rear wall 9 directed toward the face so that the lenses 11 are directly in front of the eyes. The opening 13 and the notch 24 are in registration and the nose of the user is placed in the opening when the viewer is held before the eyes in the manner mentioned. The slide to be viewed is passed through the slot-like guide opening 30 and diffused light entering through the openings 3 and 4 will illuminate the pictures on the slide so that the same will be clearly viewed through the lenses 11.

Since the device is largely composed of sheet material, such as cardboard, and the additional elements of the device are inexpensive, it can be made and sold economically, or even distributed gratis as a souvenir or used for advertising purposes. When the device is not being used it can be placed in flattened form, and it thus accommodates itself to easy mailing or shipping in quantity.

Having described one embodiment of the invention, it is obvious that the same is not to be restricted thereto, but is broad enough to cover all structures coming within the scope of the annexed claims.

What I claim is:

1. A stereoscopic viewer formed from an elongated cardboard strip, said strip being transversely folded on a number of fold lines to thereby divide the strip into a plurality of elongated panels, one of said panels being located at one end of the strip and being formed in one of its edges with a nose-receiving notch, a second panel located adjacent to the notched panel and being formed with a pair of spaced apertures covered by diffusing material, a third panel spaced from the apertured panel and having spaced openings in which lenses are mounted, the second panel being spaced from the lens-bearing panel by an intervening strip said lens-bearing panel and a panel adjacent thereto having co-operating apertures forming a nose opening, a fourth panel having a pair of sight openings, the several panels being folded in a manner to form the strip into a rectangular box in which the notched panel overlies one of the panels having the nose opening and has its notch in registration with said nose opening, the panel with the sight openings being disposed adjacent to the panel carrying the diffusing material and spaced therefrom whereby a slide may be inserted between the sight openings and said diffusing material, a flap extending from the panel with the sight openings to form a top wall for the box and flaps at the ends of several of the panels for forming end closures for the box.

2. A stereoscopic viewer consisting of a cardboard box composed of a plurality of integrally-connected panels, a first panel having a pair of spaced openings in which lenses are located, a second panel having a pair of sight openings in alignment with the lenses, a third panel having a pair of openings covered with diffusing material, the first panel constituting the front wall of the box, the third panel constituting the rear wall of the box, and the second panel constituting an intermediate wall and located adjacent to but spaced from the rear wall whereby a slide can be inserted between it and said rear wall for viewing through the lenses, the lens-carrying panel having foldable end flaps, the second panel having end flaps, and a fourth panel forming an extension of the third panel and having end flaps co-operating with those on the lens-carrying panel, and those on the second panel, for closing the opposite ends of the box.

3. A stereoscopic viewer, as provided for in claim 2, wherein the fourth panel is formed with a nose-receiving notch, the lens-carrying panel having a similar notch, said fourth and lens-carrying panels being arranged in overlying relation with their notches in registration.

References Cited in the file of this patent

UNITED STATES PATENTS

| | | |
|---|---|---|
| 2,071,120 | Harlow | Feb. 16, 1937 |
| 2,131,444 | Lateltin et al. | Sept. 27, 1938 |
| 2,321,004 | Branson | June 8, 1943 |
| 2,543,240 | Hutchinson | Feb. 27, 1951 |
| 2,662,442 | Gowland | Dec. 15, 1953 |

FOREIGN PATENTS

| | | |
|---|---|---|
| 710,240 | Germany | Sept. 8, 1941 |